J. MELEG.
AUTOMOBILE SLEIGH.
APPLICATION FILED NOV. 10, 1921.
1,435,489.
Patented Nov. 14, 1922.
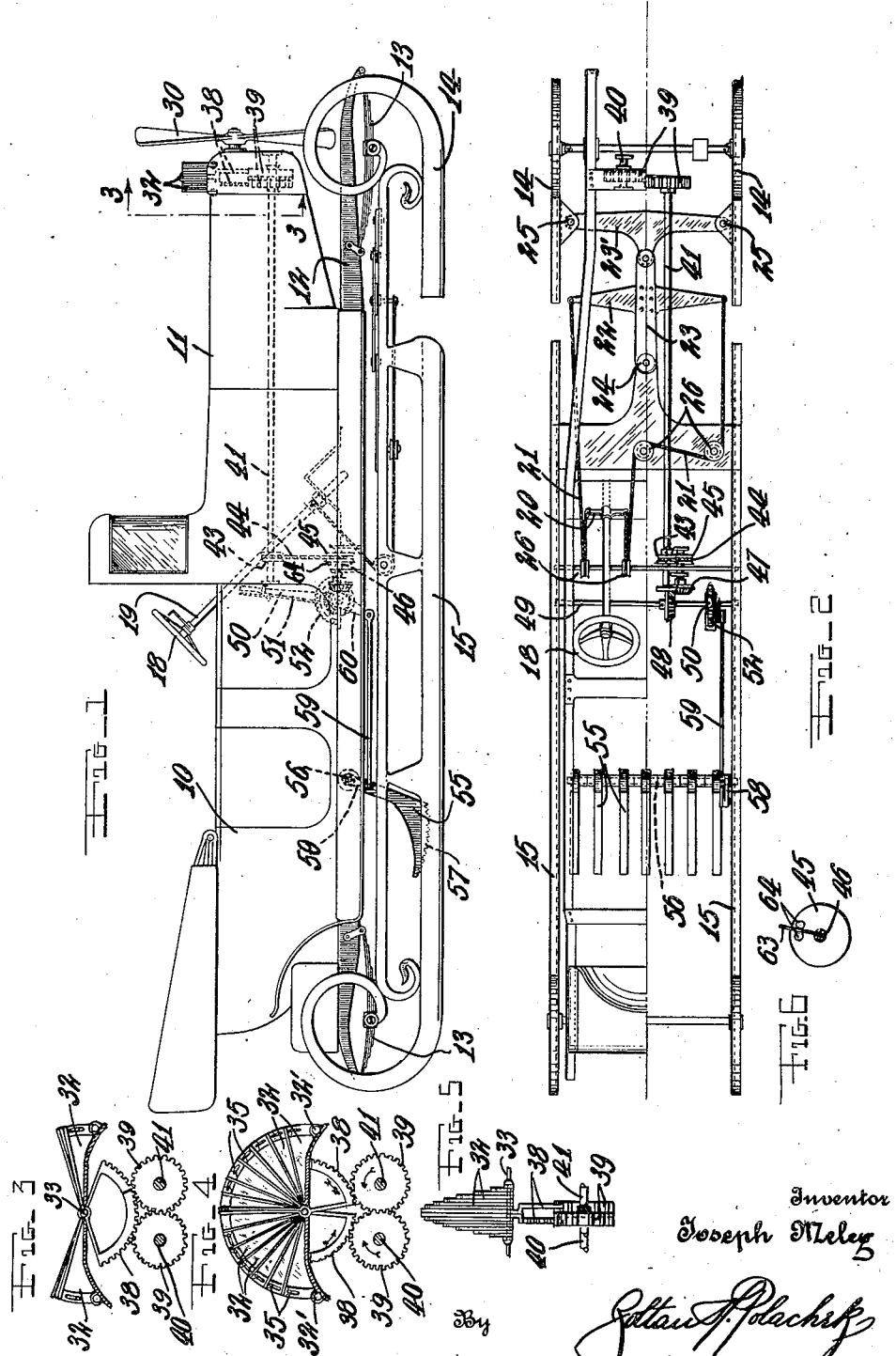

Patented Nov. 14, 1922.

1,435,489

UNITED STATES PATENT OFFICE.

JOSEPH MELEG, OF BEAVER FALLS, PENNSYLVANIA.

AUTOMOBILE SLEIGH.

Application filed November 10, 1921. Serial No. 514,150.

*To all whom it may concern:*

Be it known that I, JOSEPH MELEG, citizen of Hungary, residing at Beaver Falls, in the county of Beaver and State of Pennsylvania, have invented certain new and useful Improvements in Automobile Sleighs, of which the following is a specification.

This invention relates to an automobile sleigh which is adapted to be driven by means of an air propeller.

The invention has for an object to provide a novel and improved means for braking mechanism for bringing the sleigh to a stop, this braking mechanism including a device for neutralizing the propeller.

For further comprehension of the invention, and of the objects and advantages thereof, reference will be had to the following description and accompanying drawings, and to the appended claims in which the various novel features of the invention are more particularly set forth.

Fig. 1 of the drawings is a side view of an automobile sleigh having the invention embodied therein.

Fig. 2 is a plan view of the chassis, showing also the operating elements of the shutter adjusting means.

Fig. 3 is a detail transverse section, taken along the line 3—3 of Fig. 1, and illustrating the shutter element in closed position.

Fig. 4 is a similar view, but showing the shutter element in opened position.

Fig. 5 is an edge view of the shutter element in closed position.

Fig. 6 is a detail view showing the yielding element in the shutter extending means.

Referring now to the drawings the reference numeral 10 indicates generally the body of the sleigh which is projected forward in the form of an engine hood 11 which is preferably of circular shape as seen in end view. These parts are carried in suitable side frames 12 mounted by ordinary leaf springs 13 on front and rear runners 14 and 15.

The front runners 14 may be mounted on knuckle elements 16 and are steered by means of a wheel 18 on a shaft 19 on which is also fixed a cross-bar 20 connected by ropes 21 to opposite ends of a cross-bar 22 fixed to a T-shaped lever 23 pivoted as at 24 to the frame of the sleigh. The ends of the cross-piece 23' of the lever are pivotally attached to the front runners as at 25. The ropes 21 may be led around suitable pulleys 26 to the ends of the cross-bar 22.

The sleigh is adapted to be driven by an air propeller 30 of usual helical type and fixed on the shaft of the engine (not shown). For use when the sleigh is to be stopped I provide behind the propeller a fan-like shutter element which is illustrated in detail in Figs. 3, 4 and 5. This shutter element comprises a series of triangular vanes 32 which have a common pivotal point at 33 upon the engine hood 11. These vanes 32 are preferably made of transparent material such as celluloid fixed in suitable frames. The vanes 32 are arranged in two oppositely movable sets, the respective vanes of the different sets having slot and pin connections 35 with one another which permit of their being folded to the position shown in Fig. 3 or extended as in Fig. 4.

The vane of each set which is arranged to swing through the greatest arc has fixed thereto a quadrantal gear 38, these gear quadrants 38 meshing with respective ones of a pair of gears 39 one of which is mounted on a stub shaft 40 and the other on a rearwardly extended shaft 41. The gears 39 mesh also with one another so that upon shaft 41 being rotated the quadrants 38 will move in opposite directions. These quadrants 38 are offset laterally to clear one another as shown in Fig. 5, the gears 39 being also slightly offset to enable the quadrant engaging one gear to clear the other.

To rotate shaft 41 a small pulley 43 is mounted on the rear end thereof and is connected by a belt 44 with a large pulley 45 on a parallel stub shaft 46 mounted in suitable bearings. The stub shaft 46 has also fixed thereto a bevel gear 47 meshing with a like gear 48 on a transverse shaft 49. This transverse shaft 49 has fixed thereon a hand lever 50 which may be locked in adjusted position by the usual latch 51, engaging a notched quadrant 52.

To work in co-operation with the shutters just described I provide a series of brake or drag arms 55 fixed on a transverse shaft 56 toward the rear end of the sleigh these brake elements having toothed faces such as 57 having a spiral curvature with respect to the shaft 56. Fixed to shaft 56 is an arm 58 connected by a link 59 with a second arm 60, fixed to shaft 49.

In order to permit of the drag elements continuing their gripping position after the shutter element is extended pulley 45 is loosely mounted on shaft 46 and has a yielding connection therewith by means of a radial spring 63 fixed at one end to the shaft and projecting at opposite ends between a pair of pins 64 fixed to the pulley.

Upon operation of lever 50, to bring the sleigh to a stop, motion is transmitted through bevel gears 48 and 47, rope 44, shaft 41, gears 39 and gear quadrants 38 to the vanes 32, causing the same to spread to the position shown in Fig. 3, the end vanes being anchored to the engine hood 11 as at 32', as will be understood. The pull of the propeller 30 is thus neutralized. As the vanes reach their extended positions the drag elements 55 engage the snow or ice, and by reason of their spiral gripping faces 57, act to raise the runners so the weight of the sleigh is borne on these drag elements which quickly stop the sleigh.

With my improved device the necessity of stopping the propeller 30 every time the sleigh is to be stopped is obviated, while a slow or a quick stop can be made as desired.

Having thus described my invention what I claim as new and desire to protect by Letters Patent of the United States is as follows:

1. In a sleigh, an air propeller, a normally collapsed fan-like shutter element mounted behind said propeller, and means for extending said shutter element.

2. In a sleigh, an air propeller, a normally collapsed fan-like shutter element mounted behind said propeller, and means for extending said shutter element, said shutter element comprising two series of vanes radiating from a common point the respective vanes of each series having slot and pin connections with one another.

3. In a sleigh, an air propeller, a normally collapsed fan-like shutter element mounted behind said propeller, and means for extending said shutter element, said shutter element comprising two series of vanes radiating from a common point the respective vanes of each series having slot and pin connections with one another, said shutter extending means comprising a pair of gear segments each fixed to a vane of the respective series, a pair of gears meshing with each other and with the respective segments, and means for rotating one of said gears.

4. In a sleigh, an air propeller, a normally collapsed fan-like shutter element mounted behind said propeller, a drag element adapted to engage the surface on which the sleigh is traveling, and a common means for extending said shutter element and moving said drag element to operative position.

5. In a sleigh, an air propeller, a normally collapsed fan-like shutter element mounted behind said propeller, a drag element adapted to engage the surface on which the sleigh is traveling, and a common means for extending said shutter element and moving said drag element to operative position, said means including a rock shaft having operative connections with said shutter and drag elements, and a hand lever on said shaft.

In testimony whereof I have affixed my signature.

JOSEPH MELEG.